United States Patent
Aubuchon et al.

(10) Patent No.: US 6,834,104 B1
(45) Date of Patent: Dec. 21, 2004

(54) COMPUTER PROGRAM AND METHOD FOR AUTOMATICALLY SETTING UP CALL ROUTING FOR A METROPOLITAN STATISTICAL AREA

(75) Inventors: Kenneth J. Aubuchon, Lenexa, KS (US); Kay E. Mitchell, Kansas City, MO (US); Anthony E. Johnson, Grandview, MO (US); John G. Miller, Olathe, KS (US); Christopher E. Warren, Kansas City, MO (US); Benjamin D. Kimminau, Lee's Summit, MO (US); Ala Isam Al-Fuqaha, Kansas City, MO (US); Kenneth D. Severson, Overland Park, KS (US); Steven C. Geurin, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 09/836,807

(22) Filed: Apr. 17, 2001

(51) Int. Cl.$^7$ ................................................ H04M 7/00
(52) U.S. Cl. ............. 379/221.14; 379/219; 379/220.01

(58) Field of Search ...................... 379/221.14, 201.02, 379/201.03, 201.05, 220.01, 226, 227, 900, 211.01, 211.02

(56) References Cited

U.S. PATENT DOCUMENTS

| 5,915,012 A | * | 6/1999 | Miloslavsky | ........... 379/265.02 |
| 5,933,828 A | * | 8/1999 | Eitel et al. | ..................... 707/10 |
| 5,982,869 A | * | 11/1999 | Lozano et al. | ......... 379/200.01 |
| 6,411,699 B1 | * | 6/2002 | Fleischer et al. | ...... 379/211.02 |

* cited by examiner

Primary Examiner—Bing Bui

(57) ABSTRACT

A computer program that automatically creates call routing data files for setting up call routing in a new telecommunications switch (10) or for adding a new MSA to an existing switch. The computer program broadly comprises a code segment for receiving NPAs and NXXs for an area such as an MSA; a code segment for receiving information differentiating local calls from long distance calls for at least some of the NPAs and the NXXs in the area; and a code segment for analyzing the NPAs, the NXXs, and the information differentiating local calls from long distance calls and for automatically creating at least some of the call routing for calls originating in the area.

27 Claims, 7 Drawing Sheets

COMPUTER PROGRAM AND METHOD FOR AUTOMATICALLY SETTING UP CALL ROUTING FOR A METROPOLITAN STATISTICAL AREA

COMPUTER PROGRAM LISTING APPENDIX

A computer program listing appendix containing the source code of a computer program that may be used with the present invention is incorporated herein by reference and appended hereto as one (1) original compact disk, and an identical copy thereof, containing a total of 327 files as follows:

| Date of Creation | Size (Bytes) | Filename |
| --- | --- | --- |
| 03/22/01 03:16p | <DIR> | |
| 03/22/01 03:16p | <DIR> | |
| 06/23/00 12:25p | 6,828 | BEVELA~1.JAV |
| 06/23/00 01:31p | 12,062 | DATATA~1.JAV |
| 09/14/00 08:49p | 204 | DIGTRQ |
| 09/14/00 08:49p | 471 | DIGTRT |
| 09/14/00 08:51p | 413 | FLFRTT |
| 06/26/00 03:30p | 11,195 | FTPJDI~1.JAV |
| 06/15/00 10:11p | 4,849 | GENERA~1.JAV |
| 09/14/00 08:49p | 202 | GRPTRQ |
| 09/14/00 08:49p | 469 | GRPTRT |
| 06/26/00 03:31p | 2,379 | IONNXX~1.JAV |
| 06/26/00 04:07p | 31,966 | IONOWN~1.JAV |
| 06/23/00 12:05p | 1,213 | IONOWN~2.JAV |
| 06/26/00 02:50p | 11,872 | IONOWN~3.JAV |
| 05/09/00 02:49p | 392 | JLISTW~1.JAV |
| 05/10/00 08:58a | 1,608 | JTABLE~1.JAV |
| 06/23/00 09:41a | 8,082 | MAINPA~1.JAV |
| 06/26/00 03:40p | 11,579 | MAINPA~2.JAV |
| 06/26/00 03:41p | 11,493 | MAINPA~3.JAV |
| 05/22/00 08:45a | 5,137 | MAINTE~1.JAV |
| 05/02/00 10:33a | 3,823 | MAINTE~2.JAV |
| 05/02/00 03:36p | 447 | MAINTE~3.JAV |
| 06/21/00 02:09p | 14,210 | MAINTE~4.JAV |
| 06/26/00 03:32p | 4,537 | MSAAPP~1.JAV |
| 09/14/00 08:38p | 12,985 | MSABRCC |
| 09/14/00 08:43p | 2,317 | MSABRCH |
| 09/14/00 08:38p | 26,764 | MSABRD |
| 09/14/00 08:43p | 6,943 | MSABRH |
| 05/15/00 07:40a | 159 | MSABUI~1.JAV |
| 06/26/00 03:47p | 12,601 | MSABUI~2.JAV |
| 06/05/00 09:02a | 364 | MSABUI~3.JAV |
| 06/26/00 03:33p | 23,248 | MSABUI~4.JAV |
| 09/14/00 08:43p | 1,885 | MSACEMSH |
| 09/14/00 08:43p | 6,049 | MSACNSTH |
| 06/26/00 03:33p | 1,389 | MSACOM~1.JAV |
| 09/14/00 08:46p | 1,251 | MSACORE |
| 09/14/00 08:46p | 1,166 | MSACORE2 |
| 09/14/00 08:46p | 15,418 | MSACOREM |
| 09/14/00 08:46p | 1,030 | MSACOREN |
| 06/26/00 03:35p | 3,301 | MSAFTP~1.JAV |
| 06/26/00 03:35p | 3,800 | MSAJTA~1.JAV |
| 09/14/00 08:46p | 765 | MSALDR |
| 09/14/00 08:46p | 8,611 | MSALDRM |
| 09/14/00 08:46p | 554 | MSALDRN |
| 09/14/00 08:48p | 4,023 | MSAMAKE |
| 09/14/00 08:46p | 1,407 | MSAMAKEM |
| 09/14/00 08:46p | 0 | MSAMAKEN |
| 09/14/00 08:46p | 1,814 | MSAOLY |
| 09/14/00 08:38p | 18,133 | MSARDCC |
| 09/14/00 08:43p | 2,639 | MSARDCH |
| 09/14/00 08:38p | 39,004 | MSARDD |
| 09/14/00 08:43p | 9,524 | MSARDH |
| 09/14/00 08:46p | 941 | MSARDQ |
| 09/14/00 08:38p | 9,162 | MSARDQCC |
| 09/14/00 08:43p | 1,647 | MSARDQCH |
| 09/14/00 08:39p | 14,371 | MSARDQD |
| 09/14/00 08:44p | 7,863 | MSARDQH |
| 09/14/00 08:46p | 471 | MSARDT |
| 06/26/00 03:35p | 2,269 | MSARES~1.JAV |
| 09/14/00 08:39p | 13,736 | MSARZCC |
| 09/14/00 08:44p | 2,408 | MSARZCH |
| 09/14/00 08:39p | 30,258 | MSARZD |
| 09/14/00 08:44p | 7,446 | MSARZH |
| 09/14/00 08:46p | 328 | MSARZQ |
| 09/14/00 08:39p | 1,696 | MSARZQCC |
| 09/14/00 08:44p | 616 | MSARZQCH |
| 09/14/00 08:39p | 3,528 | MSARZQD |
| 09/14/00 08:44p | 2,403 | MSARZQH |
| 09/14/00 08:46p | 469 | MSARZT |
| 09/14/00 08:46p | 595 | MSASQL |
| 06/12/00 04:19p | 2,676 | MSASTA~1.JAV |
| 06/26/00 03:36p | 24,109 | MSASTA~2.JAV |
| 06/26/00 03:37p | 1,392 | MSASUP~1.JAV |
| 06/26/00 03:37p | 4,276 | MSASWI~1.JAV |
| 06/21/00 02:09p | 13,998 | MSATAB~1.JAV |
| 06/26/00 03:37p | 33,326 | MSATAB~2.JAV |
| 06/26/00 03:38p | 14,026 | MSATAB~3.JAV |
| 09/14/00 08:39p | 1,143 | MSATESTD |
| 09/14/00 08:39p | 1,846 | MSATST2D |
| 09/14/00 08:39p | 12,986 | MSBLRCC |
| 09/14/00 08:44p | 2,318 | MSBLRCH |
| 09/14/00 08:39p | 27,750 | MSBLRD |
| 09/14/00 08:44p | 6,946 | MSBLRH |
| 09/14/00 08:46p | 272 | MSBLRQ |
| 09/14/00 08:39p | 1,601 | MSBLRQCC |
| 09/14/00 08:44p | 625 | MSBLRQCH |
| 09/14/00 08:39p | 3,641 | MSBLRQD |
| 09/14/00 08:44p | 2,426 | MSBLRQH |
| 09/14/00 08:46p | 471 | MSBLRT |
| 09/14/00 08:39p | 15,485 | MSCAPLD |
| 09/14/00 08:44p | 4,616 | MSCAPLH |
| 09/14/00 08:39p | 9,254 | MSCBDTD |
| 09/14/00 08:44p | 6,838 | MSCBDTH |
| 09/14/00 08:39p | 24,200 | MSCBGTD |
| 09/14/00 08:44p | 11,844 | MSCBGTH |
| 09/14/00 08:39p | 41,030 | MSCBLMD |
| 09/14/00 08:44p | 14,285 | MSCBLMH |
| 09/14/00 08:39p | 4,494 | MSCBSCD |
| 09/14/00 08:44p | 5,392 | MSCBSCH |
| 09/14/00 08:39p | 7,546 | MSCBSGND |
| 09/14/00 08:44p | 12,694 | MSCBSGNH |
| 09/14/00 08:40p | 3,671 | MSCBTBD |
| 09/14/00 08:44p | 4,717 | MSCBTBH |
| 09/14/00 08:40p | 17,912 | MSCDBWD |
| 09/14/00 08:44p | 7,425 | MSCDBWH |
| 09/14/00 08:40p | 3,555 | MSCDGCD |
| 09/14/00 08:44p | 11,920 | MSCDGCH |
| 09/14/00 08:46p | 267 | MSCDILB |
| 09/14/00 08:46p | 2,063 | MSCDILBM |
| 09/14/00 08:46p | 56 | MSCDILBN |
| 09/14/00 08:40p | 6,212 | MSCELGD |
| 09/14/00 08:44p | 5,212 | MSCELGH |
| 09/14/00 08:40p | 6,021 | MSCGRCLD |
| 09/14/00 08:44p | 16,321 | MSCGRCLH |
| 09/14/00 08:40p | 6,976 | MSCITAC |
| 09/14/00 08:44p | 2,616 | MSCITAH |
| 09/14/00 08:40p | 1,954 | MSCMAIND |
| 09/14/00 08:40p | 9,499 | MSCMHLD |
| 09/14/00 08:44p | 7,743 | MSCMHLH |
| 09/14/00 08:40p | 8,998 | MSCMSERD |
| 09/14/00 08:44p | 4,591 | MSCMSERH |
| 09/14/00 08:40p | 25,975 | MSCMSRPD |
| 09/14/00 08:44p | 6,786 | MSCMSRPH |
| 09/14/00 08:40p | 5,323 | MSCNOGND |
| 09/14/00 08:44p | 5,097 | MSCNOGNH |
| 09/14/00 08:40p | 10,709 | MSCNPRD |
| 09/14/00 08:44p | 10,130 | MSCNPRH |
| 09/14/00 08:40p | 5,216 | MSCOPGND |
| 09/14/00 08:44p | 4,806 | MSCOPGNH |
| 09/14/00 08:40p | 10,672 | MSCOPRD |
| 09/14/00 08:44p | 10,444 | MSCOPRH |
| 09/14/00 08:40p | 4,572 | MSCTWRD |
| 09/14/00 08:45p | 3,766 | MSCTWRH |
| 09/14/00 08:40p | 6,434 | MSDBFILD |
| 09/14/00 08:45p | 1,538 | MSDBFILH |
| 09/14/00 08:40p | 5,696 | MSDBFRQD |

-continued

| Date of Creation | Size (Bytes) | Filename |
|---|---|---|
| 09/14/00 08:45p | 1,536 | MSDBFRQH |
| 09/14/00 08:41p | 33,618 | MSDBSQLC |
| 09/14/00 08:45p | 5,979 | MSDBSQLH |
| 09/14/00 08:46p | 815 | MSDBSVR |
| 09/14/00 08:41p | 3,815 | MSDBSVRD |
| 09/14/00 08:45p | 2,645 | MSDBSVRH |
| 09/14/00 08:46p | 12,487 | MSDBSVRM |
| 09/14/00 08:46p | 611 | MSDBSVRN |
| 09/14/00 08:41p | 12,871 | MSDDGTND |
| 09/14/00 08:45p | 1,872 | MSDDGTNH |
| 09/14/00 08:45p | 1,499 | MSDENUMH |
| 09/14/00 08:45p | 2,790 | MSDEXTNH |
| 09/14/00 08:41p | 15,909 | MSDGRTND |
| 09/14/00 08:45p | 1,868 | MSDGRTNH |
| 09/14/00 08:41p | 8,856 | MSDIONOD |
| 03/02/01 11:29a | 1,673 | MSDIONOH |
| 09/14100 08:41p | 5,417 | MSDLCLTD |
| 09/14/00 08:45p | 1,532 | MSDLCLTH |
| 09/14/00 08:41p | 5,403 | MSDMNPAD |
| 09/14/00 08:45p | 1,527 | MSDMNPAH |
| 09/14/00 08:41p | 6,158 | MSDMSAD |
| 09/14/00 08:45p | 1,546 | MSDMSAH |
| 09/14/00 08:41p | 6,605 | MSDNPAD |
| 09/14/00 08:45p | 1,538 | MSDNPAH |
| 09/14/00 08:41p | 7,228 | MSDRDEFD |
| 03/02/01 11:29a | 1,535 | MSDRDEFH |
| 03/02/01 11:28a | 8,158 | MSDSCRQD |
| 03/02/01 11:29a | 1,764 | MSDSCRQH |
| 03/02/01 11:28a | 5,983 | MSDSMDLD |
| 03/02/01 11:29a | 1,837 | MSDSMDLH |
| 03/02/01 11:28a | 8,585 | MSDSMIND |
| 03/02/01 11:29a | 1,859 | MSDSMINH |
| 03/02/01 11:28a | 8,412 | MSDSMUPD |
| 03/02/01 11:29a | 1,859 | MSDSMUPH |
| 09/14/00 08:41p | 7,686 | MSDSWTKD |
| 09/14/00 08:45p | 1,534 | MSDSWTKH |
| 03/02/01 11:28a | 6,839 | MSDTRIDD |
| 03/02/01 11:29a | 1,788 | MSDTRIDH |
| 09/14/00 08:47p | 267 | MSELOG |
| 03/02/01 11:28a | 1,383 | MSELOGD |
| 03/02/01 11:29a | 726 | MSELOGH |
| 09/14/00 08:47p | 2,196 | MSELOGM |
| 09/14/00 08:47p | 56 | MSELOGN |
| 03/02/01 11:29a | 269 | MSERRLG |
| 09/14/00 08:47p | 2,199 | MSERRLGM |
| 09/14/00 08:47p | 56 | MSERRLGN |
| 03/02/01 11:28a | 1,945 | MSESQLC |
| 03/02/01 11:29a | 351 | MSESQLH |
| 03/02/01 11:28a | 4,344 | MSGBLFD |
| 03/02/01 11:29a | 1,511 | MSGBLFH |
| 03/02/01 11:28a | 1,897 | MSGBRVD |
| 03/02/01 11:29a | 1,222 | MSGBRVH |
| 03/02/01 11:29a | 1,668 | MSGCNSTH |
| 03/02/01 11:28a | 1,939 | MSGDBRD |
| 03/02/01 11:29a | 1,151 | MSGDBRH |
| 03/02/01 11:28a | 8,713 | MSGDTMFD |
| 03/02/01 11:29a | 1,796 | MSGDTMFH |
| 09/14/00 08:41p | 9,620 | MSGDTVRD |
| 09/14/00 08:45p | 2,888 | MSGDTVRH |
| 03/02/01 11:28a | 3,307 | MSGELIND |
| 03/02/01 11:29a | 2,409 | MSGELINH |
| 03/02/01 11:28a | 25,771 | MSGEND |
| 03/02/01 11:29a | 3,943 | MSGENH |
| 03/02/01 11:29a | 1,071 | MSGENRT |
| 09/14/00 08:47p | 9,620 | MSGENRTM |
| 09/14/00 08:47p | 754 | MSGENRTN |
| 03/02/01 11:28a | 1,982 | MSGFFTD |
| 03/02/01 11:29a | 1,326 | MSGFFTH |
| 03/02/01 11:28a | 4,933 | MSGFIBUD |
| 03/02/01 11:29a | 1,793 | MSGFIBUH |
| 03/02/01 11:28a | 2,871 | MSGFIFFD |
| 03/02/01 11:29a | 1,236 | MSGFIFFH |
| 03/02/01 11:29a | 1,879 | MSGFIFOD |
| 03/02/01 11:29a | 1,655 | MSGFIFOH |
| 09/14/00 08:41p | 14,295 | MSGGTVRD |
| 09/14/00 08:45p | 2,882 | MSGGTVRH |
| 03/02/01 11:28a | 3,702 | MSGPRGED |

-continued

| Date of Creation | Size (Bytes) | Filename |
|---|---|---|
| 03/02/01 11:29a | 1,289 | MSGPRGEH |
| 03/02/01 11:28a | 2,814 | MSGREQFD |
| 03/02/01 11:29a | 1,254 | MSGREQFH |
| 03/02/01 11:28a | 6,820 | MSGRIBD |
| 03/02/01 11:29a | 1,741 | MSGRIBH |
| 03/02/01 11:28a | 11,757 | MSGSCRQD |
| 03/02/01 11:29a | 5,357 | MSGSCRQH |
| 03/02/01 11:28a | 5,941 | MSGSMSWD |
| 03/02/01 11:29a | 3,991 | MSGSMSWH |
| 03/02/01 11:29a | 10,203 | MSGSQLC |
| 03/02/01 11:29a | 5,530 | MSGSQLH |
| 03/02/01 11:28a | 8,200 | MSGSVCD |
| 03/02/01 11:29a | 2,951 | MSGSVCH |
| 03/02/01 11:28a | 10,786 | MSGTDTD |
| 03/02/01 11:29a | 4,031 | MSGTDTH |
| 03/02/01 11:28a | 9,158 | MSGTLTD |
| 03/02/01 11:29a | 3,523 | MSGTLTH |
| 03/02/01 11:28a | 1,808 | MSGTNTD |
| 03/02/01 11:29a | 1,185 | MSGTNTH |
| 03/02/01 11:29a | 854 | MSGTRIMH |
| 03/02/01 11:28a | 4,405 | MSGTUPKD |
| 03/02/01 11:28a | 1,916 | MSGTUPKH |
| 03/02/01 11:28a | 2,080 | MSGUFNGD |
| 03/02/01 11:29a | 1,152 | MSGUFNGH |
| 09/14/00 08:42p | 2,182 | MSGVERSD |
| 09/14/00 08:45p | 1,079 | MSGVERSH |
| 09/14/00 08:42p | 3,271 | MSGVRFCD |
| 09/14/00 08:45p | 1,322 | MSGVRFCH |
| 03/02/01 11:28a | 3,546 | MSGWFLFD |
| 03/02/01 11:29a | 1,429 | MSGWFLFH |
| 03/02/01 11:28a | 3,671 | MSLCTRLD |
| 03/02/01 11:29a | 1,359 | MSLCTRLH |
| 03/02/01 11:28a | 10,950 | MSLFLPRD |
| 03/02/01 11:29a | 4,037 | MSLFLPRH |
| 03/02/01 11:28a | 25,351 | MSLLDRD |
| 03/02/01 11:29a | 3,111 | MSLLDRH |
| 03/02/01 11:28a | 1,742 | MSLLNPRD |
| 03/02/01 11:29a | 551 | MSLLNPRH |
| 03/02/01 11:29a | 3,551 | MSLPRFCD |
| 03/02/01 11:28a | 1,502 | MSLPRFCH |
| 03/02/01 11:28a | 25,377 | MSLRDPRD |
| 03/02/01 11:29a | 3,122 | MSLRDPRH |
| 03/02/01 11:29a | 10,416 | MSLRZPRD |
| 03/02/01 11:29a | 2,887 | MSLRZPRH |
| 03/02/01 11:28a | 24,528 | MSLSQLC |
| 03/02/01 11:29a | 1,448 | MSLSQLH |
| 03/02/01 11:28a | 17,566 | MSLSTORD |
| 03/02/01 11:29a | 3,111 | MSLSTORH |
| 03/02/01 11:29a | 3,139 | MSLSTRUH |
| 03/02/01 11:28a | 14,180 | MSLSVCSD |
| 03/02/01 11:29a | 2,502 | MSLSVCSH |
| 03/02/01 11:28a | 189 | MSLSVRD |
| 03/02/01 11:28a | 3,480 | MSPCORED |
| 03/02/01 11:29a | 1,512 | MSPCOREH |
| 03/02/01 11:29a | 2,370 | MSPEXTNH |
| 03/02/01 11:28a | 4,104 | MSPFGRQD |
| 03/02/01 11:29a | 1,624 | MSPFGRQH |
| 03/02/01 11:28a | 3,974 | MSPLDRQD |
| 03/02/01 11:29a | 1,603 | MSPLDRQH |
| 03/02/01 11:28a | 82,038 | MSPSQLC |
| 03/02/01 11:29a | 6,053 | MSPSQLH |
| 03/02/01 11:28a | 8,054 | MSPUIRQD |
| 03/02/01 11:29a | 1,709 | MSPUIRQH |
| 03/02/01 11:28a | 561 M | SPURGE |
| 03/02/01 11:28a | 2,414 | MSPURGED |
| 03/02/01 11:29a | 1,886 | MSPURGEH |
| 09/14/00 08:47p | 5,408 | MSPURGEM |
| 09/14/00 08:47p | 351 | MSPURGEN |
| 06/02/00 11:02a | 422 | NPAINF~1.JAV |
| 06/26/00 03:42p | 2,194 | PURGER~1.JAV |
| 09/14/00 08:51p | 407 | REQFIT |
| 05/05/00 01:18p | 1,484 | ROWHEA~1.JAV |
| 03/02/01 11:28a | 14,028 | RQFILECC |
| 03/02/01 11:29a | 2,161 | RQFILECH |
| 03/02/01 11:28a | 30,809 | RQFILED |
| 03/02/01 11:29a | 7,701 | RQFILEH |
| 09/14/00 08:51p | 765 | SCHDLRST |

-continued

| Date of Creation | Size (Bytes) | Filename |
|---|---|---|
| 06/01/00 04:12p | 1,461 | SCHEDU~1.JAV |
| 03/02/01 11:28a | 30,008 | SCHREQCC |
| 03/02/01 11:29a | 3,280 | SCHREQCH |
| 03/02/01 11:28a | 63,385 | SCHREQD |
| 03/02/01 11:29a | 14,223 | SCHREQH |
| 03/02/01 11:29a | 740 | SDPTYPEH |
| 06/26/00 03:43p | 11,356 | SEARCH~1.JAV |
| 06/21/00 02:09p | 13,025 | SEARCH~2.JAV |
| 03/02/01 11:28a | 20,099 | SMBLSVCC |
| 03/02/01 11:29a | 2,888 | SMBLSVCH |
| 03/02/01 11:28a | 40,898 | SMBLSVD |
| 03/02/01 11:29a | 9,804 | SMBLSVH |
| 09/14/00 08:49p | 1,140 | SMBLVQ |
| 09/14/00 08:49p | 478 | SMBLVT |
| 09/14/00 08:49p | 469 | SMISNQ |
| 09/14/00 08:49p | 472 | SMISNT |
| 03/02/01 11:28a | 12,678 | SMIXSVCC |
| 03/02/01 11:29a | 2,143 | SMIXSVCH |
| 03/02/01 11:28a | 26,529 | SMIXSVD |
| 03/02/01 11:29a | 6,765 | SMIXSVH |
| 03/02/01 11:28a | 14,547 S | MSWCC |
| 03/02/01 11:29a | 2,062 | SMSWCH |
| 03/02/01 11:28a | 32,115 | SMSWD |
| 03/02/01 11:29a | 8,059 | SMSWH |
| 06/26/00 03:43p | 7,103 | SQLCON~1.JAV |
| 06/12/00 09:30a | 93 | SQLCON~2.JAV |
| 09/14/00 08:50p | 2,817 | SRQSTQ |
| 06/26/00 03:43p | 6,672 | STATUS~1.JAV |
| 06/26/00 03:44p | 31,354 | TABLED~1.JAV |
| 05/12/00 08:37a | 2,122 | TABLEH~1.JAV |
| 06/26/00 03:44p | 3,086 | TABLEM~1.JAV |
| 06/26/00 03:44p | 2,136 | TABLER~1.JAV |
| 06/26/00 03:45p | 11,637 | TABLES~1.JAV |
| 06/26/00 03:45p | 3,099 | VIEWER~1.JAV |
| 06/26/00 03:45p | 7,040 | VIEWER~2.JAV |
| 06/26/00 03:45p | 6,276 | VIEWER~3.JAV |

BACKGROUND OF THE INVENTION

1. Field of the Invention

The present invention relates to telecommunications switches. More particularly, the invention relates to a computer program and method for automatically setting up call routing in a telecommunications switch serving a metropolitan statistical area.

2. Description of the Prior Art

Telecommunications companies are beginning to offer broadband home and business communications systems that integrate a number of communications services. For example, Sprint Communications Company, L.P. has recently introduced its ION broadband communications service that carries voice, data, and video over one connection. The service permits subscribers to make telephone calls, send and receive faxes, and use the Internet simultaneously.

To integrate voice and data over the same connection, broadband services require the use of voice-over-IP (Internet protocol) local routing switches for the voice component of the services. Two examples of voice-over-IP local routing switches are the GTE Service Manager Switch and the Telcordia Service Gateway Service Manager Switch.

Voice-over-IP local routing switches typically support a number of data tables that include customer information, routing data, and network architecture information. One such table, commonly referred to as a Digit Translator table, includes information used to group sets of phone number digits together that should be routed and charged the same. Another, commonly referred to as a Group Translator table, includes information used for routing and charging calls based on the grouping of digits in the Digit Translator table. The information in the Group Translator table matches attributes of the caller (such as geographic area and originating service) to determine whether to complete a call and, if so, to what destination.

Because of cost and infrastructure constraints, broadband communications services are currently being provided only to cities or regions having populations of 50,000 or more, commonly referred to as metropolitan statistical areas (MSAs). Each time broadband communications services are to be provided to a new MSA, one or more voice-over-IP local routing switches must be set up with core call routing for the MSA. Core call routing determines, among other things, how calls are routed between originating numbers and terminating numbers and whether calls are billed as local calls or long distance calls. All call routing is based upon the area where a call originates and requires an accurate call routing scheme in order to terminate the call correctly.

Establishing core call routing for an MSA is a complex process requiring a review of that MSA's area codes (commonly referred to as NPAs), the first three digits of all telephone numbers for the area (commonly called NXXs), 7-digit versus 10-digit dialing patterns between NPAs (such as 816 versus 913 area code dialing patterns in the Kansas City MSA), trunk groups and terminating end offices, and files which are used to differentiate local calls from long distance calls. Two of the most time-consuming tasks in setting up core call routing are creating the Digit and Group Translator tables referenced above.

Currently, telecommunications companies generate all call routing for voice-over-IP switches manually. This is very labor-intensive, especially for larger MSAs. For an average MSA, communications companies can spend up to 8 weeks generating all necessary call routing data. Creation of the Digit Translator and Group Translator tables for the New York MSA required a Sprint translations department to assemble and review 184,000 rows of call routing information to build the appropriate call routing, taking over eight weeks to complete.

The complexity and singularity of an MSA's local call routing eliminates the possibility of creating call routing data that can be copied from an existing MSA and used for a new MSA. This inability to reuse call routing data between voice-over-IP switches means that the approximate 8 week manual process of creating call routing must be performed every time a new voice-over-IP switch is set up or a new MSA is added to an existing switch.

The demand for broadband communications services is expected to grow rapidly. For example, current projections show that Sprint's ION customer base will increase over 100 fold and coverage will increase from just several MSAs to the top 100 MSAs nationwide within a year. However, a telecommunications company's ability to expand broadband services to more customers is dependent upon its ability to quickly set up, load, and maintain call routing information on voice-over-IP switches. Thus, establishing call routing manually as described above is a real obstacle to broadband service growth.

SUMMARY OF THE INVENTION

The present invention solves the above-described problems and provides a distinct advance in the art of telecommunications switches. More particularly, the present invention dramatically reduces the time required to create call routing data for a new voice-over-IP switch or for a new MSA added to an existing switch.

One embodiment of the present invention is implemented with a computer program that automatically creates call routing data files for setting up call routing in a new telecommunications switch or for adding a new MSA to an existing switch. The computer program broadly comprises a code segment for receiving NPAs and NXXs for an area such as an MSA; a code segment for receiving information differentiating local calls from long distance calls for at least some of the NPAs and the NXXs in the area; and a code segment for analyzing the NPAs, the NXXs, and the information differentiating local calls from long distance calls and for automatically creating the majority of the call routing for calls originating in the area. The call routing that may be created with the present invention includes, for example, functionality for differentiating local calls from long distance calls, functionality for differentiating interLATA from intraLATA calls, functionality for handling calls to information numbers, functionality for determining 1+ dialing for 500 numbers and toll-free numbers (800, 888, 877, etc.), functionality for handling international calling, and functionality for calls related to telephone repair.

The computer program of the present invention can be used to create Digit Translator and Group Translator tables for a new MSA in minutes rather than the 8 week time period required for manual methods. The present invention allows new voice-over-IP switches to be put into production and new MSAs added to existing switches in a fraction of the time required by manual methods, removing one of the major obstacles to increasing broadband service coverage and freeing up resources for other call routing and support duties.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
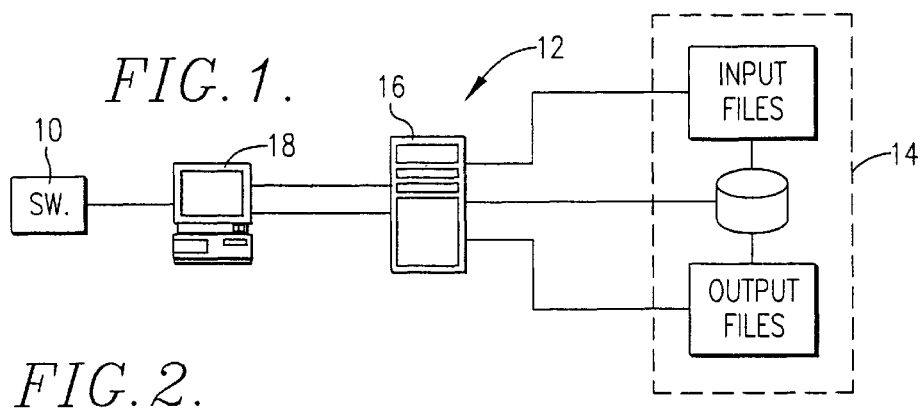
FIG. 1 is a schematic diagram of computer and telecommunications equipment that may be used to implement certain aspects of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

As generally depicted in FIG. 1, the present invention may be used to set up call routing in one or more telecommunications switches 10 (only one shown) that each provide telecommunications services in a metropolitan statistical area (MSA) or other geographic area. The switches are preferably voice-over-IP routing switches (often referred to herein as merely "switch" or "switches") such as the service manager switches manufactured by GTE or the Service Gateway Service manager switches manufactured by Telcordia. Each switch supports a plurality of data tables that contain, among other things, call routing information or data used to route calls serviced by the switch. Two such tables are the Digit Translator and Group Translator tables described in the background section above.

The present invention can be implemented in hardware, software, firmware, or a combination thereof. In a preferred embodiment, the invention is implemented with one or more computer programs that operate a computer system broadly referred to by the numeral 12 in FIG. 1. The preferred computer system 12 includes a server computer 14, a server computer 16, and one or more user computers 18. The present invention is not limited, however, to any particular computer programs or computer systems, but rather may be implemented with many different configurations of computer technology without departing from the scope of the present invention.

The server computer 14 may be any conventional computing device but is preferably a Tandem C++ server having a D series or later operating system. The server computer 14 supports a number of input files, internal databases, and output files as described in more detail below.

The server computer 16 may also be any conventional computing device but is preferably a Dell 6300 series computer. The server computer 16 is programmed with a series of HTML pages that may be accessed by the user computer 18 or other computers with a browser to implement certain steps of the invention. The server computer 16 is also programmed with a Java applet that is served to the user computer 18 and launched by one or more of the HTML pages to perform certain aspects of the present invention as described below. Inside certain ones of the HTML pages are parameters that drive the behavior of the applet. For example, a parameter may be the location of a database containing information relating to the switch 10. The server computer 16 runs a SQL engine for accessing information in the database of the server computer 14. The server computer 16 also coordinates the transfer of files and other information between the server computer 14 and the user computer 18.

Each user computer 18 may be any conventional computing device such as a personal computer manufactured by Dell. Any desired number of user computers 18 may be coupled with the server computer 16 by a communications network such as a local area network (LAN), a wide area network (WAN), an intranet, an extranet, or the Internet. Each user computer 18 permits an operator or administrator, such as a member of a network translations group at Sprint or other telecommunications company, to access the server computer 16 to perform certain steps of the present invention described herein.

The computer programs of the present invention are stored in or on computer-readable medium residing on or accessible by the computer system 12 as described herein. The computer program or utility that creates the files or tables used for setting up call routing on the switch 10 is a Java-based client residing on or accessible by the server computer 14. Each computer program preferably comprises an ordered listing of executable instructions for implementing logical functions in the computer system 12 and can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. The computer programs of the present invention are preferably created using Tandem Frameworks programs and concepts disclosed in co-pending patent applications: "Communicating Between a Process And a Destination," Ser. No. 09/684,768, filed Oct. 6, 2000 (Sprint Docket No.1335); "Method and Apparatus For Accessing a Database," Ser. No.09/684,767, filed Oct. 6, 2000 (Sprint Docket No. 1306); and "Base Framework in Software Applications," Ser. No. 09/684,769, filed Oct. 6, 2000 (Sprint Docket No.1357), all of which are incorporated into the present application by reference.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The process for setting up a new voice-over-IP switch or adding a new MSA to an existing switch begins when an operator or administrator at a telecommunications company such as a network translations person at Sprint uses one of the computers 18 to enter information into HTML pages served by the server computer 16. The information relates to call routing criteria for the MSA of interest such as NPAs, NXXs, dialing patterns, trunk groups, terminating end offices, and files used to differentiate between local and long distance calls. This information is transferred to the server computer 14 via the server computer 16 where it is analyzed by an MSA build utility or program residing on or accessible by the server computer 14. The server computer then automatically creates output files, including a Digit Translator table and a Group Translator table, for setting up core call routing for a new voice-over-IP switch 10 or a new MSA being added to the switch. The output files are then transferred from the server computer 14 to the user computer 18 via the server computer 16. An operator of the user computer 18 may add additional call routing data and/or files to the output files and then transfers the completed files for uploading to the switch 10. The files may be uploaded in several formats as described below.

Figure 2:
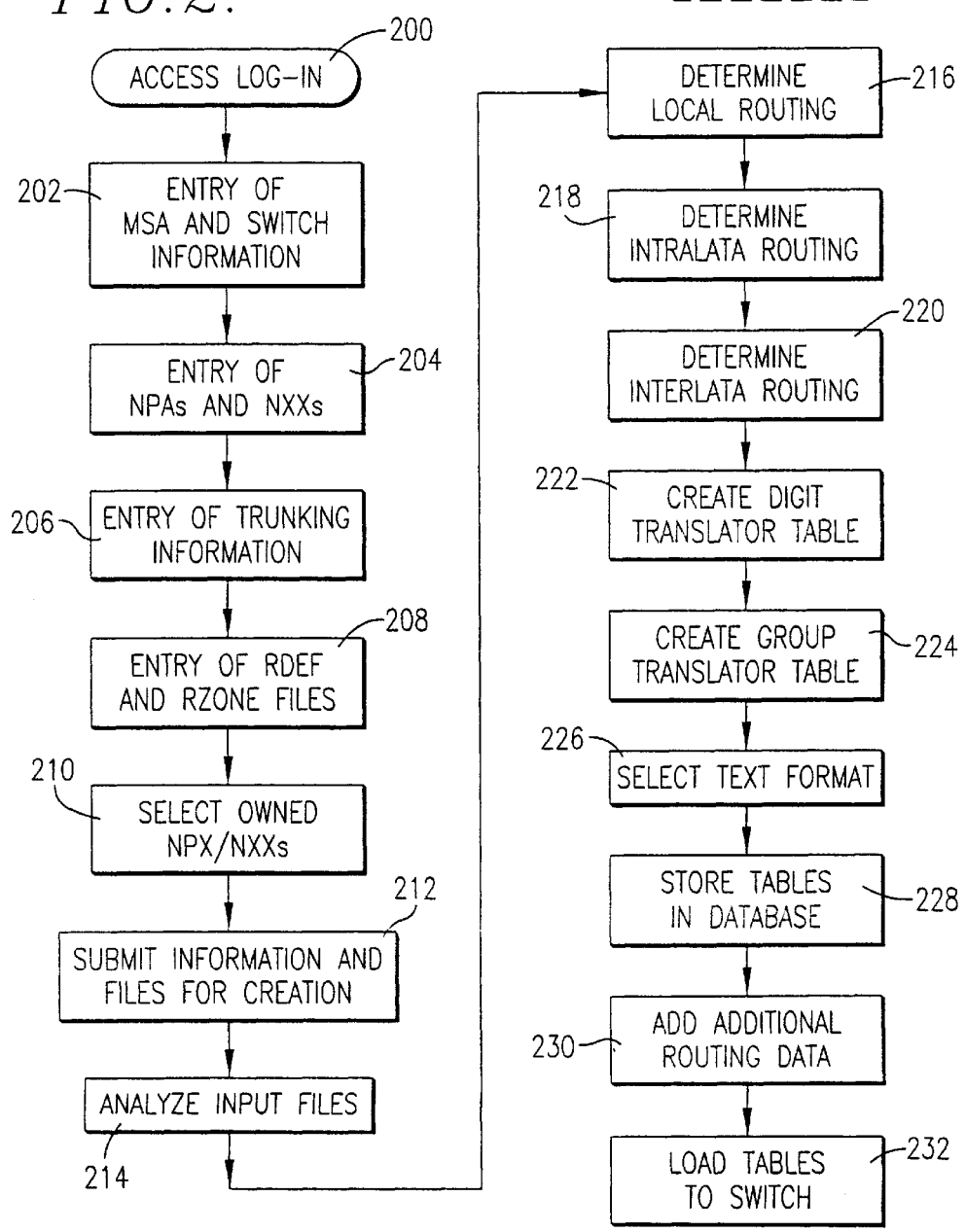
FIG. 2 is a flow diagram broadly depicting certain steps of the present invention.

The flow chart of FIG. 2 shows the functionality and operation of a preferred implementation of the present invention in more detail. In this regard, some of the blocks of the flow chart may represent a module segment or portion of code of the computer programs of the present invention which comprises one or more executable instructions for implementing the specified logical function or functions. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved.

Use of the present invention begins when an operator or administrator, such as a network translations person at Sprint, operates a browser on the user computer 18 to access the server computer 16 as depicted in box 200 of FIG. 2. This accesses a Java applet that presents a log-in screen prompting the operator to enter certain log-in information such as a user name and a password.

Figure 3:
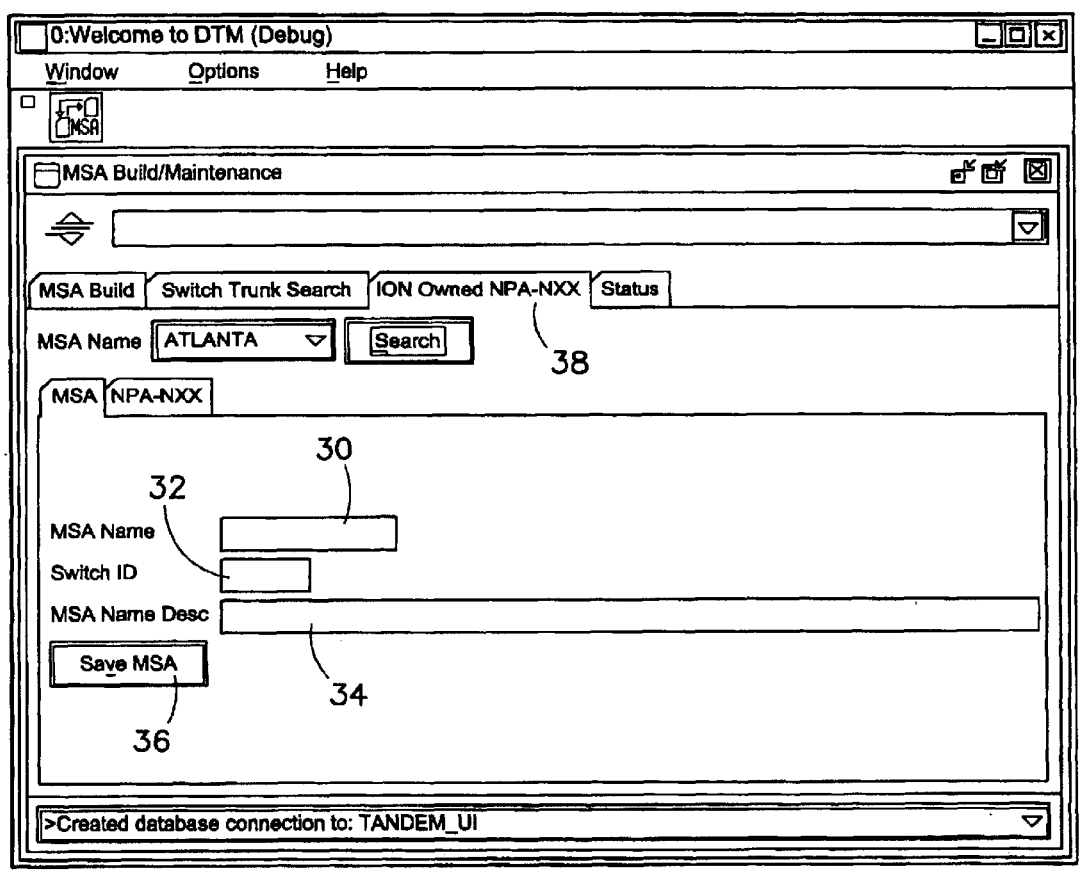
FIG. 3 is a screen shot of one of the screens presented by the computer program of the present invention.

After logging in, the operator is prompted to enter certain MSA and switch information to identify the MSA for which call routing is to be created as depicted in box 202 of FIG. 2. To assist in the entry of this information, the Java applet displays a screen such as the one illustrated in FIG. 3 that includes a field 30 for entering the name of an MSA for which call routing is being created (for example, New York), a field 32 for entering the ID for the switch handling call routing for the MSA (for example, 2055), and a field 34 for entering an MSA name description (for example, New York). After entering this information, the operator should click a "Save MSA" button or tab 36.

Figure 4:
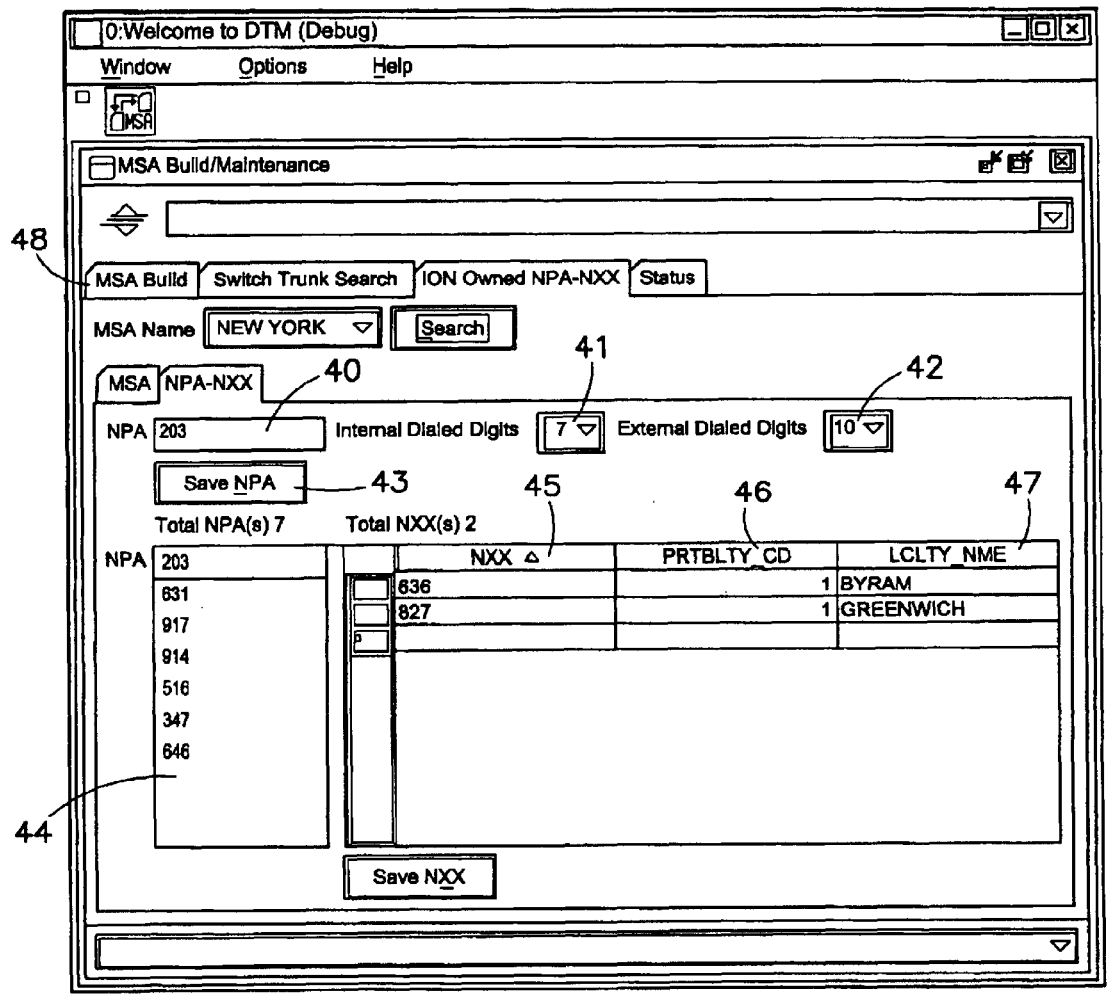
FIG. 4 is a screen shot of one of the screens presented by the computer program of the present invention.

The program next prompts the operator to enter certain NPA and NXX information for the selected MSA as depicted in box 204 of FIG. 2. To do so, the operator clicks on an "NPA/NXX" tab or button 38 depicted in FIG. 3 to present a screen such as the one illustrated in FIG. 4. This screen includes fields 40, 41 that prompt the operator to enter the NPAs owned by the telecommunications company providing broadband services in the area and the associated internal and external dialing plans for each NPA. The operator should click on a "Save NPA" tab or button 43 after each NPA is added. Selecting the Save NPA button 43 lists each of the entered NPAs in a column 44. Each NPA may then be highlighted so that all its associated NXXs may be added in an adjacent column 45. The screen also includes a column 46 for assigning a portability indicator and a column 47 for entering a locality name for each NXX.

Figure 5:
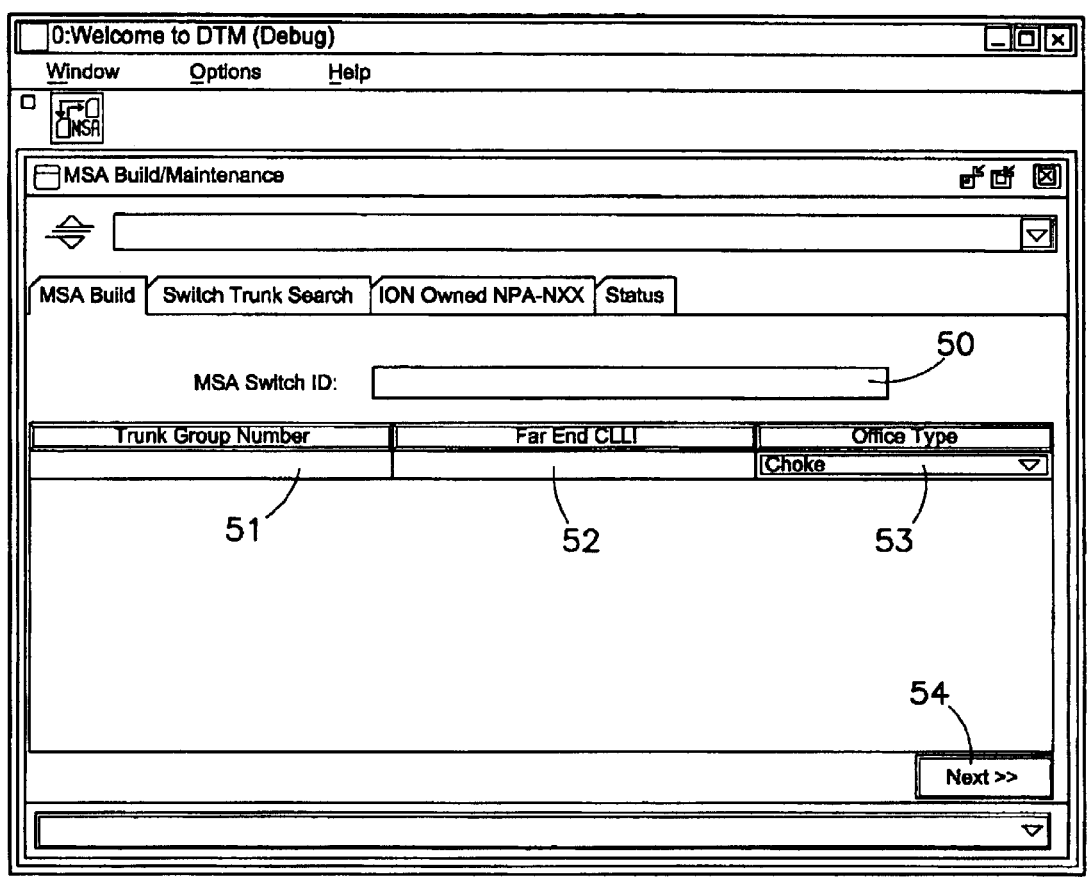
FIG. 5 is a screen shot of one of the screens presented by the computer program of the present invention.

When all NPAs and associated NXXs have been entered, the operator is next prompted to enter certain trunking information for the switch 10 servicing the MSA as depicted in box 206 of FIG. 2. To do so, the operator first clicks on an "MSA Build" tab or button 48 depicted in FIG. 4 to run the MSA build utility or computer program of the present invention. This displays a screen such as the one illustrated in FIG. 5 that includes a field 50 for entering the MSA switch ID, a column 51 for entering the trunk group numbers, a column 52 for entering far end common language location identifiers (CLLIs), and a column 53 for entering an office type for each trunk. After entering all trunking information, the operator should press a "Next" tab or button 54.

The computer program next prompts the operator to enter region definition (RDEF) and region zone (RZONE) files as depicted in box 208 of FIG. 2. The RDEF file lists all of the terminating NXXs in an MSA that are local to at least one of the originating MSA areas. The RZONE file defines the locality names for all possible originating areas and also defines which localities are local and which are long distance relative to those originating areas.

The RDEF and RZONE files are typically provided by a billing services department of the telecommunications company providing the broadband communications services and include extraneous information. Therefore, prior to submitting them to the server computer 14 for use in creating the output files, the operator should remove all duplicate rows from both the RDEF and RZONE files. The operator should also remove all rows from the RDEF file with the exception of the following: NPA, NXX, Locality, RC, PI, and Local Tandem to Route Calls to rows. Finally, the operator should remove all rows from the RZONE file with the exception of the following: ORIG LOC and TERM LOC. When the operator is finished, the RZONE and RDEF files should be similar to the following example files:

RZONE

| ORIG LOC | TERM LOC |
|---|---|
| AMITYVILLE | ALBERTSON |
| AMITYVILLE | AMAGANSETT |
| AMITYVILLE | AMITYVILLE |
| AMITYVILLE | ARDSLEY |
| AMITYVILLE | ARMONK VLG |
| AMITYVILLE | ASTORIA |
| AMITYVILLE | ATLANTIC |
| AMITYVILLE | BABYLON |
| AMITYVILLE | BAITNGHLLW |
| AMITYVILLE | BALDWIN |
| AMITYVILLE | BAY SHORE |
| AMITYVILLE | BAYPORT |
| AMITYVILLE | BAYVILLE |
| AMITYVILLE | BEDFORDVLG |
| AMITYVILLE | BELLEROSE |
| AMITYVILLE | BELLPORT |
| AMITYVILLE | BIRCHWOOD |
| AMITYVILLE | BRENTWOOD |
| AMITYVILLE | BREWSTER |
| AMITYVILLE | BRIDGEMPTN |
| AMITYVILLE | BRONX |
| AMITYVILLE | BROOKLYN |
| AMITYVILLE | BROOKVILLE |
| AMITYVILLE | CALVERTON |
| AMITYVILLE | CARMEL |
| AMITYVILLE | CEDARHURST |
| AMITYVILLE | CENTEREACH |
| AMITYVILLE | CENTRAISLP |
| AMITYVILLE | CHAPPAQUA |
| AMITYVILLE | COLDSPGHBR |
| AMITYVILLE | COLDSPRING |

RDEF

| NPA | NXX | LOCALITY | RC | PI | Local Tandem to Route Calls To: |
|---|---|---|---|---|---|
| 203 | 636 | BYRAM | BYRAM | N | N/A |
| 203 | 827 | GREENWICH | GREENWICH | N | N/A |
| 516 | 286 | VLY STREAM | VLY STREAM | N | N/A |
| 516 | 376 | ROSLYN | ROSLYN | N | N/A |
| 516 | 473 | GARDENCITY | GARDENCITY | N | N/A |
| 203 | 219 | STAMFORD | STAMFORD | N | 2055/38 |
| 203 | 223 | STAMFORD | STAMFORD | N | 2055/38 |
| 203 | 249 | STAMFORD | STAMFORD | N | 2055/38 |
| 203 | 251 | STAMFORD | STAMFORD | Y | 2055/38 |
| 203 | 252 | STAMFORD | STAMFORD | Y | 2055/38 |
| 203 | 253 | STAMFORD | STAMFORD | N | 2055/38 |
| 203 | 274 | STAMFORD | STAMFORD | N | 2055/38 |
| 203 | 275 | STAMFORD | STAMFORD | N | 2055/38 |
| 203 | 278 | GREENWICH | GREENWICH | Y | 2055/16 |
| 203 | 282 | STAMFORD | STAMFORD | N | 2055/38 |
| 203 | 290 | GREENWICH | GREENWICH | Y | 2055/16 |
| 203 | 302 | GREENWICH | GREENWICH | Y | 2055/16 |
| 203 | 316 | STAMFORD | STAMFORD | Y | 2055/38 |

The modified files should then be saved in EXCEL as Comma Delimited.

Figure 6:
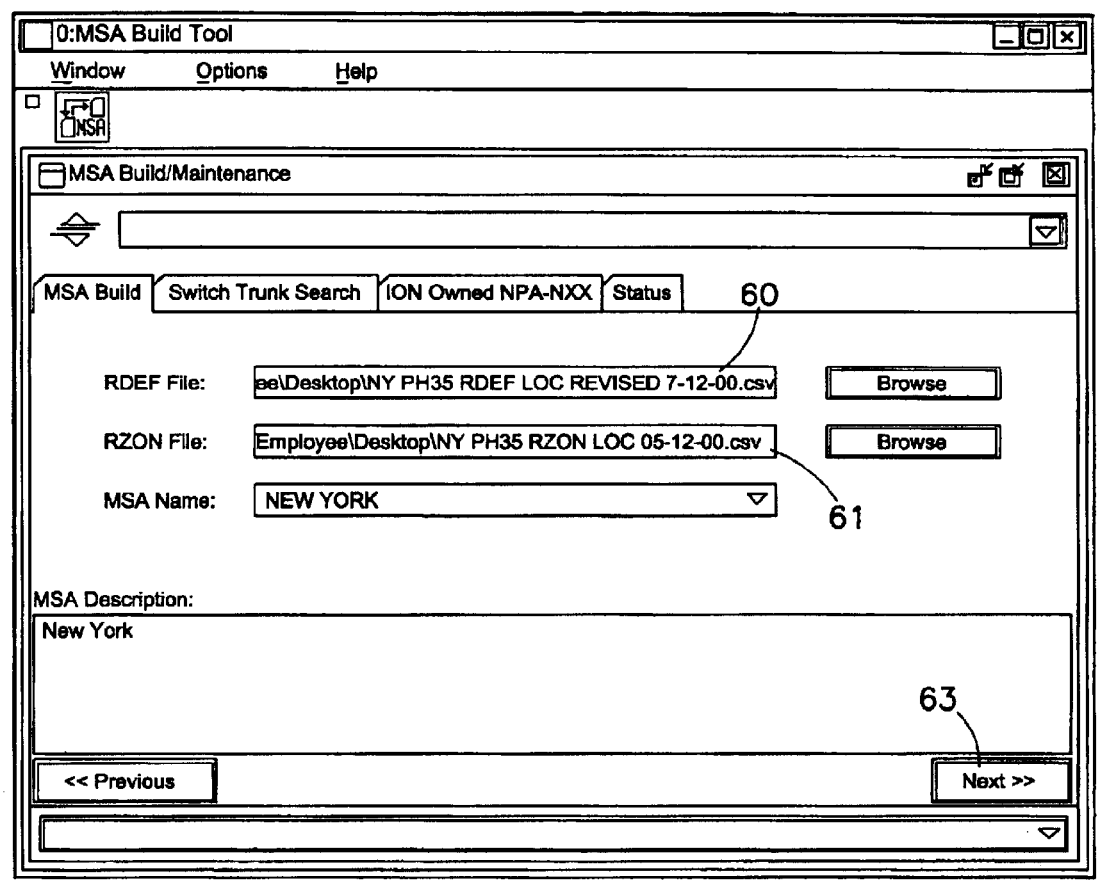
FIG. 6 is a screen shot of one of the screens presented by the computer program of the present invention.

To assist in entering these files into the MSA build utility, the Java applet presents a screen such as the one depicted in FIG. 6 that includes fields 60, 61 that prompt for the entry of the RDEF file name and the RZONE file name. The operator should ensure the correct MSA name is listed and the correct RDEF and RZONE file names have been entered. If so, the operator should click on a "Next" button or tab 63.

The operator should next select the NPAs and NXXs that are owned by the telecommunications company providing the broadband communications services for the MSA as depicted in box 210 of FIG. 2. To assist in this process, the Java applet displays a screen such as the one depicted in FIG. 7. The screen includes a column 70 listing all of the NPA/NXX combinations associated with the MSA. The operator should highlight each of the NPA/NXX combinations that are owned by the telecommunications company and move them to an adjacent column 71. Once all of the owned NPA/NXX combinations are moved to the column, all necessary information and files needed to create a portion of the core call routing for the switch has been entered and the files and information described above are ready to be submitted to the MSA build utility or program.

Figure 7:
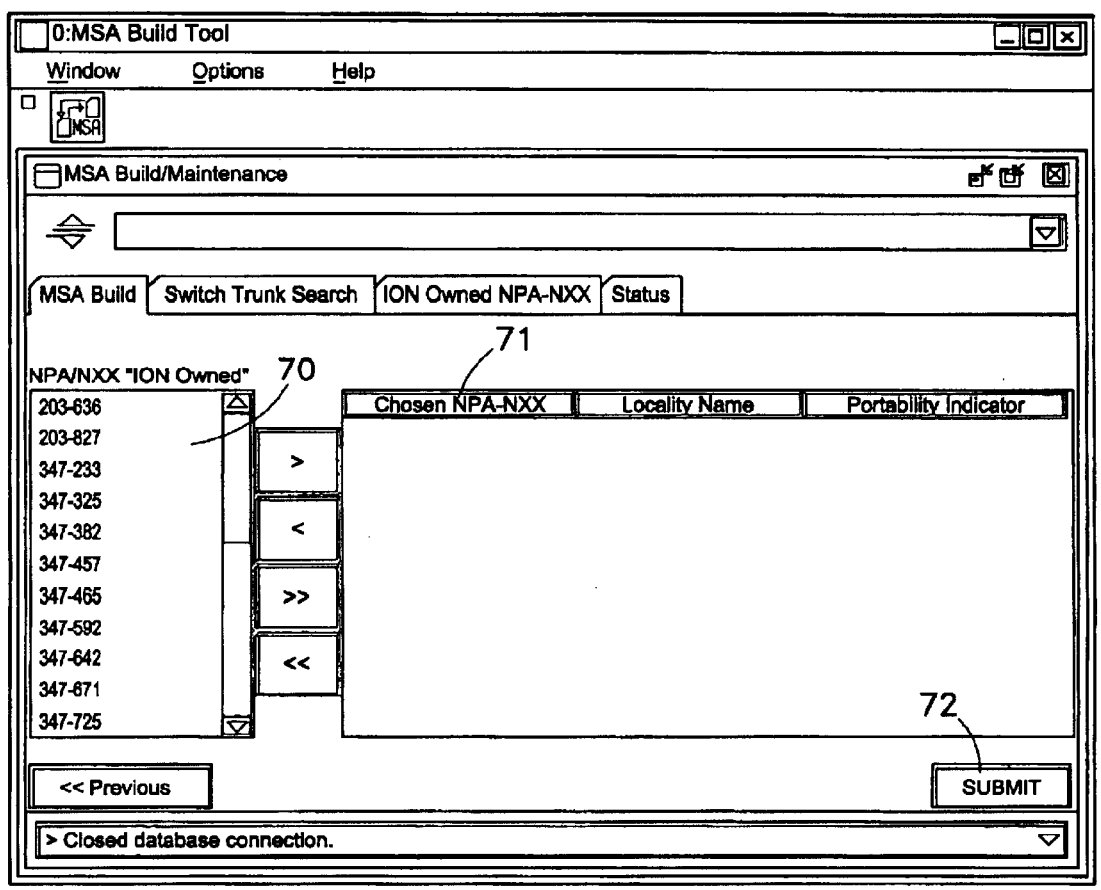
FIG. 7 is a screen shot of one of the screens presented by the computer program of the present invention.

To submit the input files and other information to the server computer 14, the operator should click on a "Submit" button or tab 72 illustrated in FIG. 7. The MSA build utility then analyzes the RDEF and RZONE files as well as the other information entered by the operator as depicted in step 214 to automatically create output files used for setting up core call routing. Specifically, the MSA build utility determines for all NPA/NXX combinations which calls are local calls, intraLATA calls, or interLATA calls as depicted in boxes 216, 218, and 220. The computer program also incorporates the created routing data into a Digit Translator table and a Group Translator table as depicted in steps 222 and 224.

The operator next must select a loading format for the newly created Digit Translator and Group Translator tables as depicted in box 226 of FIG. 2. The operator may choose to generate the tables in either a bulk load format or a DTM format. The bulk load format imports the tables into Microsoft Access so that they may then be uploaded to the telecommunications switch 10 via Telcordia's Bulk Load tool. The DTM format permits the tables to be incrementally added to the telecommunications switch 10 via a computer program disclosed in co-pending patent application entitled Computer Program And Method For Modifying Data Tables in a Telecommunications Switch, Ser. No. 09/678,013, filed Oct. 3, 2000, hereby incorporated into the present application by reference.

Figure 8:
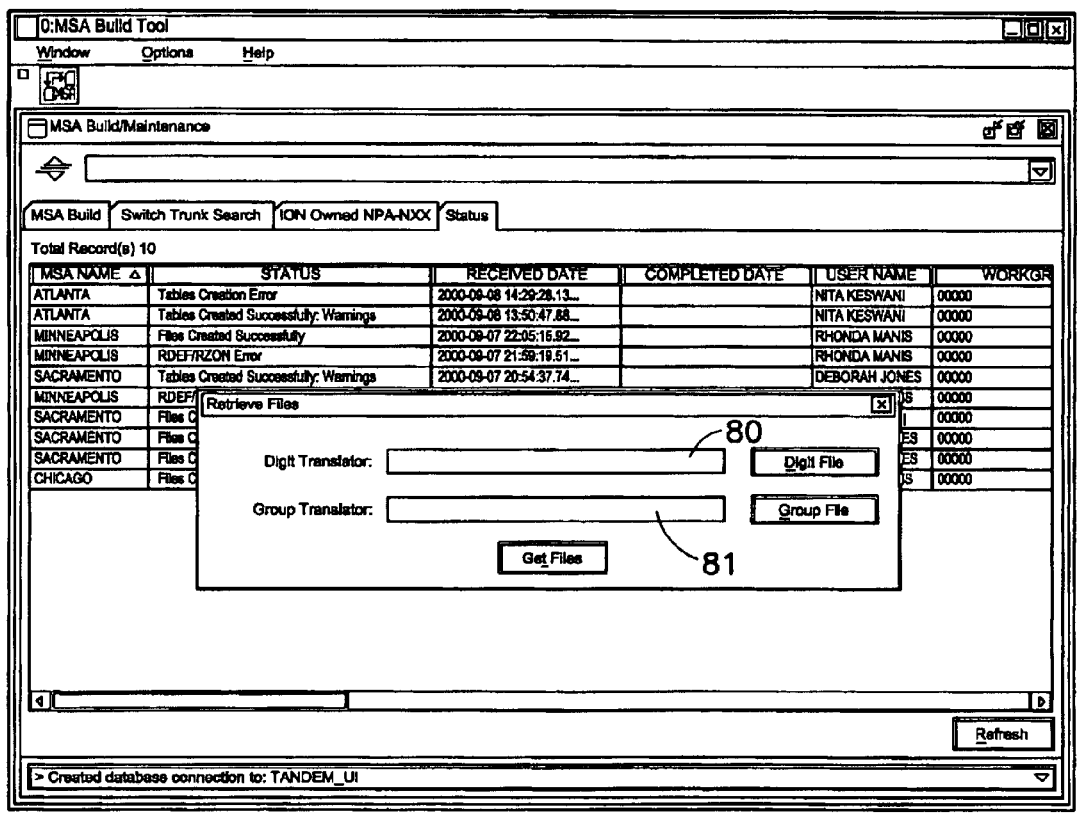
FIG. 8 is a screen shot of one of the screens presented by the computer program of the present invention.

Once the tables have been created and generated in the selected format, the operator may transfer the files from the server computer 14 to the user computer 18 as depicted in box 228 of FIG. 2. The files are preferably transferred via file transfer protocol (FTP). To assist in this process, the applet presents a screen such as the one depicted in FIG. 8 which prompts the operator to enter the directory and file name for the Digit Translator and Group Translator tables in fields 80, 81. This FTPs the tables to the hard drive of the user computer 18 in the selected text format and to the specified directory.

The operator may then add additional routing data to the tables as depicted in box 230. Finally, the operator loads the tables and other routing data to the switch 10 via the selected upload mechanism as depicted in box 232. Examples of completed Digit and Group Translator tables are as follows:

DIGIT TRANSLATOR FILE

TRANSLATOR_NAME | FROM_DIGITS | TO DIGITS | MINIMUM_DIGIT LENGTH | MAXIMUM_DIGIT_LENGTH | PORTABILITY_INDICATOR | OPERATOR_GROUP_NAME | NON_OPERATOR_GROUP_NAME | COMMENT | ACTION
203636 | 2 | 9 | 10 | 10 | 1 MISDIALING10_RTE | MISDIALING10 RTE | |
203636 | 203201 | 203201 | 10 | 10 | 1 | OPER_INTER | DMS_INTER | |
203636 | 203202 | 203202 | 10 | 10 | 2 | OPER_INTER | DMS_INTER | |
203636 | 203204 | 203204 | 10 | 10 | 2 | OPER_INTER | DMS_INTER | |
203636 | 203205 | 203205 | 10 | 10 | 2 | OPER_INTER | DMS_INTER | |
203636 | 203206 | 203206 | 10 | 10 | 1 | OPER_INTER | DMS_INTER | |
203636 | 203207 | 203207 | 10 | 10 | 2 | OPER_INTER | DMS_INTER | |
203636 | 203208 | 203208 | 10 | 10 | 2 | OPER_INTER | DMS_INTER | |
203636 | 203209 | 203209 | 10 | 10 | 2 | OPER_INTER | DMS_INTER | |
203636 | 203210 | 203210 | 10 | 10 | 2 | OPER_INTER | DMS_INTER | |
203636 | 203213 | 203213 | 10 | 10 | 1 | OPER_INTER | DMS_INTER | |
203636 | 203214 | 203214 | 10 | 10 | 1 | OPER_INTER | DMS_INTER | |
203636 | 203215 | 203215 | 10 | 10 | 1 | OPER_INTER | DMS_INTER | |
203636 | 203216 | 203216 | 10 | 10 | 1 | OPER_INTER | DMS_INTER | |
203636 | 203217 | 203217 | 10 | 10 | 1 | OPER_INTER | DMS_INTER | |
203636 | 203218 | 203218 | 10 | 10 | 1 | OPER_INTER | DMS_INTER | |
203636 | 203220 | 203220 | 10 | 10 | 2 | OPER_INTER | DMS_INTER | |
203636 | 203221 | 203221 | 10 | 10 | 2 | OPER_INTER | DMS_INTER | |
203636 | 203222 | 203222 | 10 | 10 | 2 | OPER_INTER | DMS_INTER | |
GROUP TRANSLATOR FILE

TRANSLATOR_NAME | GROUP_NAME | PREFIX_TYPE_NAME | ORIGINATING_CLASS_CODE_NAME | ORIGINATING_AREA_NAME | SECONDARY_CLASSMARK_LIST | GEOGRAPHIC_AREA_NAME | CHARGE_CLASS_NAME | NEXT_TRANSLATOR_TYPE | NEXT_TRANSLATOR_NAME | DELETE_DIGIT_COUNT | PREPEND_DIGITS | BUILD_OUT_DIGITS | BUILD_OUT_DIGITS_CODE_LENGTH | ROUTING_CLASS_TYPE | ROUTING_CLASS_NAME | COMMENT | ACTION
203636 | DMS_INTER | DDDPLUS | @ | @ | @ | @ | INTERLATA | | | | | | 2 | NYC_250_RTE | |
203636 | DMS_INTER | NOPREFIX | @ | @ | @ | @ | NORECORD | | | | | | 2 | MISDIALING_CAUSE_10_RTE | |
203636 | DMS_INTRA | DDDPLUS | @ | @ | @ | @ | INTERLATA | | | | | | 2 | NYC_250_RTE | |
203636 | DMS_INTRA | NOPREFIX | @ | @ | @ | @ | NORECORD | | | | | | MISDIALING_CAUSE_10_RTE | |
203636 | HNPA_102_10D | DDDPLUS | @ | @ | @ | @ | NORECORD | | | | | | 2 | MISDIALING_CAUSE_N8_N9_RTE | |
203636 | HNPA_102_10D | NOPREFIX | @ | @ | @ | @ | LOCAL | | | | | | 1 | | |
203636 | HNPA_102_7D | DDDPLUS | @ | @ | @ | @ | NORECORD | | | | | | 2 | MISDIALING_CAUSE_N8_N9_RTE | |
203636 | HNPA_102_7D | NOPREFIX | @ | @ | @ | @ | LOCAL | | | | | 203 | | 1 | | |
203636 | HNPA_102_10D | DDDPLUS | @ | @ | @ | @ | NORECORD | | | | | | 2 | MISDIALING_CAUSE_N8_N9_RTE | |
203636 | HNPA_203_10D | NOPREFIX | @ | @ | @ | @ | LOCAL | | | | | | 1 | | |

Although the invention has been described with reference to the preferred embodiment illustrated in the attached drawing figures, it is noted that equivalents may be employed and substitutions made herein without departing from the scope of the invention as recited in the claims. For example, although the computer programs of the present invention have been disclosed herein as being used for setting up call routing in new switches or for adding new MSAs to existing switches, the computer programs may also be used for ongoing maintenance of existing switches. When new NPA/NXX combinations are added to a telecommunications network, they must be added to each switch providing services in the area. The computer programs of the present invention may be used to create new rows in the Digit and Group Translator tables for the new NPA/NXX combinations. The text files generated in this manner may then be uploaded to the appropriate switches using DTM as described above.

Having thus described the preferred embodiment of the invention, what is claimed as new and desired to be protected by Letters Patent includes the following:

1. A computer program stored on a computer-readable medium for directing operation of a computer to automatically create files for setting up call routing in a telecommunications switch that provides telecommunications services in an area, the computer program comprising:

a code segment for receiving NPAs and NXXs for the area;

a code segment for receiving information differentiating local calls from long distance calls for at least some of the NPAs and the NXXs; and a code segment for analyzing the NPAs, the NXXs, and the information differentiating local calls from long distance calls and for automatically creating the files containing information relating to at least some of the call routing for calls originating in the area.

2. The computer program as set forth in claim 1, the area being a metropolitan statistical area.

3. The computer program as set forth in claim 1, the telecommunications switch being a voice-over-IP switch.

4. The computer program as set forth in claim 3, the telecommunications services including broadband communications services carrying voice, data, and video over one connection.

5. The computer program as set forth in claim 1, the call routing including local call routing, interLATA call routing, and intraLATA call routing.

6. The computer program as set forth in claim 1, further including a code segment for prompting entry of the NPAs and the NXXs into the computer.

7. The computer program as set forth in claim 1, further including a code segment for prompting entry of the information differentiating local calls from long distance calls.

8. The computer program as set forth in claim 1, the information differentiating local calls from long distance calls including information from an RDEF file and a RZONE file.

9. The computer program as set forth in claim 1, the files created by the computer program including a digit translator table and a group translator table.

10. The computer program as set forth in claim 9, further including a code segment for permitting selection of a text format for the digit translator table and the group translator table.

11. The computer program as set forth in claim 10, the text format including a bulk load text format and a DTM text format.

12. A method for creating files for setting up call routing in a telecommunications switch that provides telecommunications services in an area, the method comprising the steps of:

entering into a computer NPAs and NXXs for the area;

entering into the computer information differentiating local calls from long distance calls for at least some of the NPAs and the NXXs;

automatically creating with a computer program residing on or accessible by the computer the files for setting up the call routing; and uploading the files to the telecommunications switch.

13. The method as set forth in claim 12, the area being a metropolitan statistical area.

14. The method as set forth in claim 12, the telecommunications switch being a voice-over-IP switch.

15. The method as set forth in claim 14, the telecommunications services including broadband communications services carrying voice, data, and video over one connection.

16. The method as set forth in claim 12, the call routing including local call routing, interLATA call routing, and intraLATA call routing.

17. The method as set forth in claim 12, the information differentiating local calls from long distance calls including information from an RDEF file and a RZONE file.

18. The method as set forth in claim 12, the files created by the computer program including a digit translator table and a group translator table.

19. The method as set forth in claim 18, further including the step of permitting selection of a text format for the digit translator table and the group translator table.

20. The method as set forth in claim 19, the text format including a bulk load text format and a DTM text format.

21. A computer program stored on a computer-readable medium for directing operation of a computer to automatically create files for setting up call routing in a voice-over-IP telecommunications switch that provides telecommunications services in a metropolitan statistical area, the computer program comprising:

a code segment for receiving NPAs and NXXs for the metropolitan statistical area;

a code segment for receiving at least portions of an RDEF file;

a code segment for receiving at least portions of an RZONE file;

a code segment for receiving trunking information for the telecommunications switch; and a code segment for analyzing the NPAs, the NXXs, the portions of the RDEF file, the portions of the RZONE file, and the trunking information and for automatically creating at least some of the call routing for calls originating in the metropolitan statistical area.

22. The computer program as set forth in claim 21, the telecommunications services including broadband communications services carrying voice, data, and video over one connection.

23. The computer program as set forth in claim 21, the call routing including local call routing, interLATA call routing, and intraLATA call routing.

24. The computer program as set forth in claim 21, the files created by the computer program including a digit translator table and a group translator table.

25. The computer program as set forth in claim 24, further including a code segment for permitting selection of a text format for the digit translator table and the group translator table.

26. The computer program as set forth in claim 25, the text format including a bulk load text format and a DTM text format.

27. A computer program stored on a computer-readable medium for directing operation of a computer to automatically create files for setting up call routing in a telecommunications switch that provides telecommunications services in an area, the computer program comprising:

a code segment for receiving NPAs and NXXs for the area;

a code segment for receiving information differentiating local calls from long distance calls for at least some of the NPAs and the NXXs;

a code segment for analyzing the NPAs, the NXXs, and the information differentiating local calls from long distance calls and for automatically creating at least some of the call routing for calls originating in the area;

wherein the files created by the computer program including a digit translator table and a group translator table; and a code segment for permitting selection of a text format for the digit translator table and the group translator table, wherein the text format including a bulk load text format and a DTM text format.

* * * * *